Nov. 24, 1953
T. J. LEHANE
2,660,407
CONTROL SYSTEM FOR CONTROLLING THE TEMPERATURES
OF INDIVIDUAL ENCLOSURES
Filed Dec. 1, 1949
3 Sheets-Sheet 1
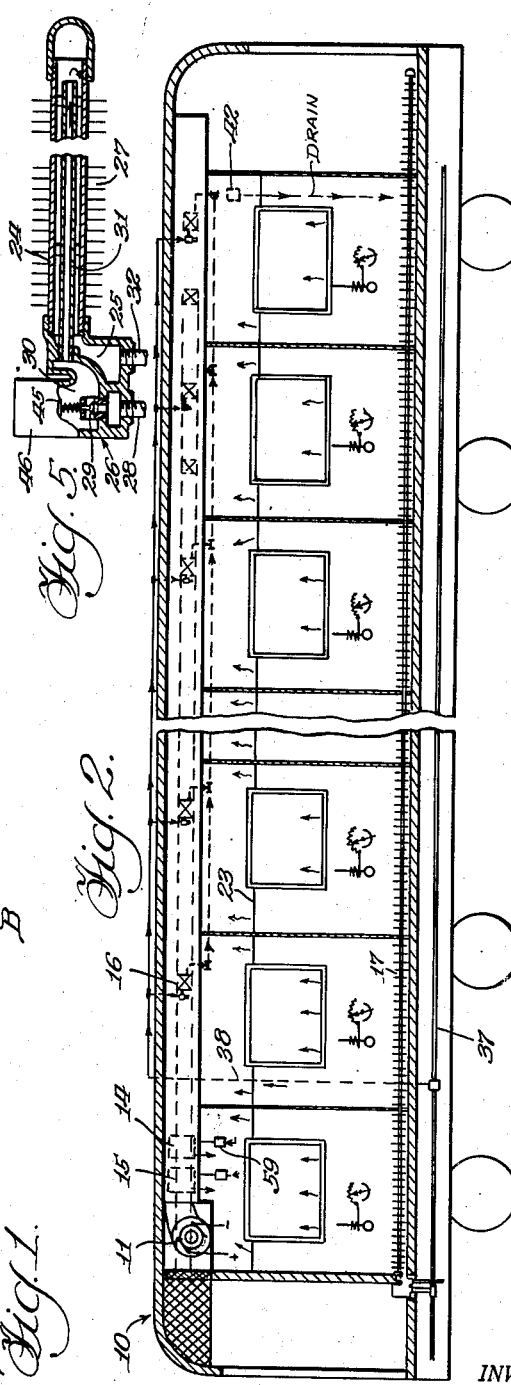
INVENTOR.
Timothy J. Lehane
BY
Harvey M. Gillespie
Atty.

Nov. 24, 1953  T. J. LEHANE  2,660,407
CONTROL SYSTEM FOR CONTROLLING THE TEMPERATURES
OF INDIVIDUAL ENCLOSURES
Filed Dec. 1, 1949  3 Sheets-Sheet 2

INVENTOR.
Timothy J. Lehane
BY
Harvey M. Gillespie
Atty.

Patented Nov. 24, 1953

2,660,407

UNITED STATES PATENT OFFICE 2,660,407

CONTROL SYSTEM FOR CONTROLLING THE TEMPERATURES OF INDIVIDUAL ENCLOSURES

Timothy J. Lehane, North Riverside, Ill., assignor to Vapor Heating Corporation, Chicago, Ill., a corporation of Delaware Application December 1, 1949, Serial No. 132,025

10 Claims. (Cl. 257—3)

This invention relates to an improved control system for controlling the temperature of individual enclosures arranged in a group.

A principal object of the present invention is to provide an automatic control system of the above character which is particularly suitable for use in connection with temperature altering apparatus composed of means for delivering tempered air (heated or cooled) into the several enclosures of a group including heating and cooling apparatus serving all enclosures of the group and individual air conditioners for each enclosure.

Another object is to provide, in a control system of the above character, control elements responsive to temperatures affecting the several enclosures as a group and other control elements responsive to the temperatures of the individual enclosures; and also to provide means for adjusting the functional setting of certain of the temperature responsive elements, which adjustment serves to proportionately vary the adjustment of another control element of the system.

Specifically the invention contemplates a control system including control thermostats responsive to the temperatures of individual enclosures of a group and one or more control thermostats responsive to the temperature components affecting the group of enclosures as a whole and to also provide means for adjusting the thermostats to vary their individual temperature settings, which adjusting means, for certain of said thermostats, includes connections for automatically adjusting the temperature setting of the thermostat means which responds to the temperature components affecting the group of enclosures.

According to the present invention, the controls are interconnected to control temperature altering apparatus comprising means for tempering air for delivery into a plurality of enclosures, means for heating the air immediately before it is introduced into the individual enclosures of the group, and means including heat radiator elements, for example floor radiators, each serving a plurality of said enclosures and adapted to deliver heat directly into the enclosures associated therewith to supplement the heating functions of the other air heating elements.

The control system includes an outside thermostat adapted to function at a predetermined outside temperature to make cooling effective, when the inside temperatures of the enclosures are such as to make cooling desirable.

When the cooling apparatus is functioning, the heating medium is shut off from the floor radiators and from the main air heater, but heating medium remains available for the booster heaters, since it may be desirable to raise the temperature of the air delivered into a selected enclosure during both the heating and cooling cycles of the system.

The main air tempering apparatus (both heating and cooling) are controlled by means including heating and cooling control thermostats located in a main delivery duct so as to respond to the temperature of the air within said duct. The means for controlling the floor radiators includes a thermostat responsive to the temperature of the wall panel defining one side wall of each enclosure of a group of such enclosures. The several booster heaters are controlled by means including separate thermostats located in the individual enclosures served by an associated booster heater. The last mentioned thermostats are provided with auxiliary electrical heaters and means for varying the heating effect thereof so as to adjust the functional setting of the thermostats in accordance with the wishes of the occupant. The said adjusting means also includes connections with a similar heater for the floor radiator control thermostat whereby the floor radiator thermostat is automatically proportionately adjusted in relation to the adjustment of the individual enclosure thermostat. The other thermostats, except the outside thermostat, are provided with electrical heaters which are so connected in the control system as to produce cycling operations of the thermostats when the temperatures in their various localities come within a selected range of their temperature setting.

The invention is illustrated in the accompanying drawings in connection with a railway car sub-divided into separate compartments, but the specific illustration is for the purpose of convenience only and should not be regarded as a limitation.

In the drawings:

Fig. 1 is a plan view in section illustrating a railway car sub-divided into a plurality of separate compartments and illustrating main and branch air ducts for delivering tempered air from a common source into the several compartments.

Fig. 2 is a vertical longitudinal section through the car construction shown in Fig. 1 and illustrating the arrangements of the several temperature altering means.

Fig. 5 is a longitudinal sectional view of one of the floor radiators installed in the said car.

Figure 3:
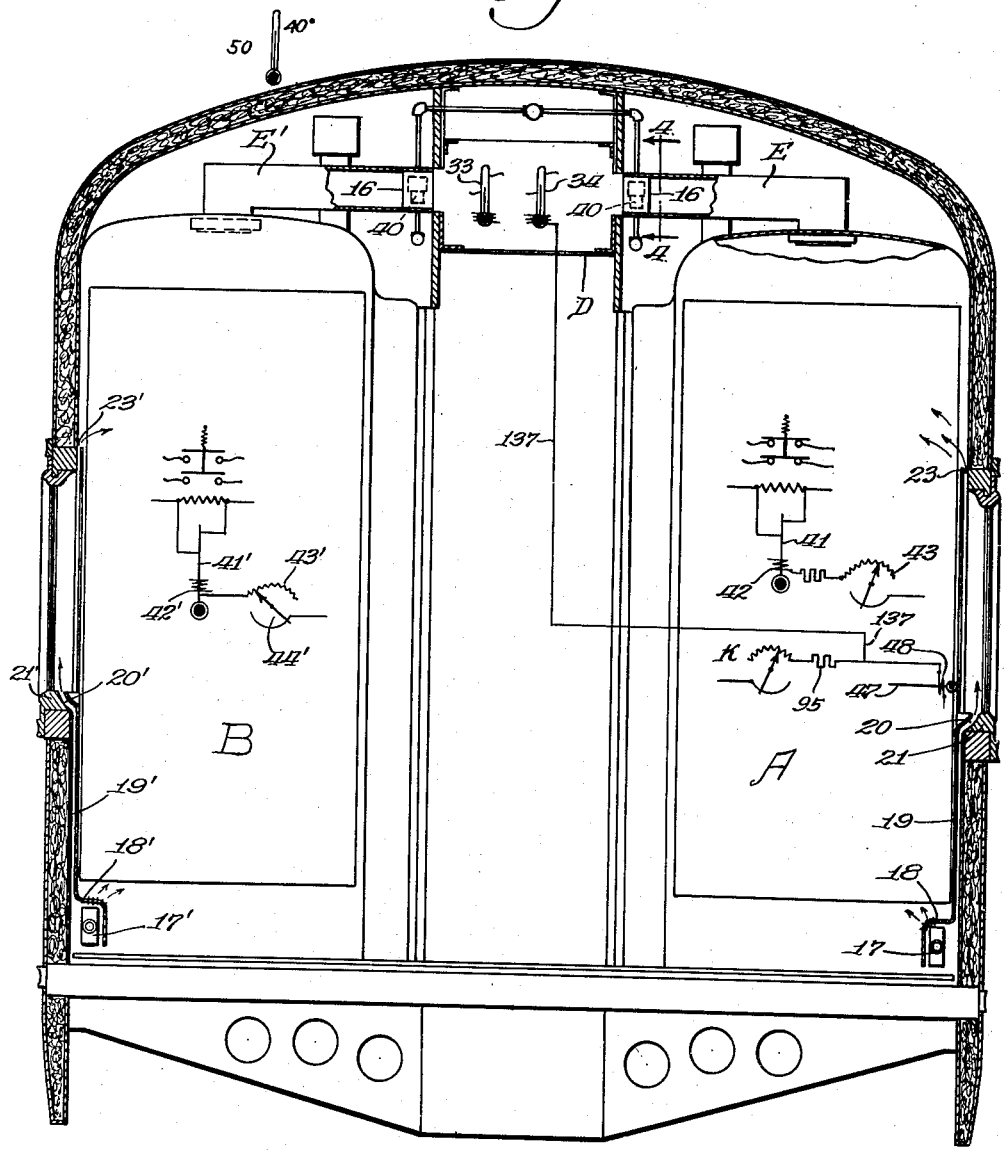
Fig. 3 is a transverse vertical section through the car illustrating the position of the air supply and circulating ducts associated with the several temperature altering apparatuses.
Figure 4:
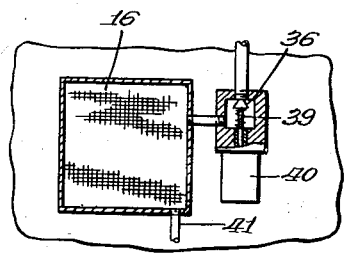
Fig. 4 is a fragmentary view of a booster heater for adding heat to the air delivered into the individual compartments of the car.

Referring to the drawings: The car is designated by the reference numeral 10 and is subdivided into a series of separate compartments designated A along one side of the car and a similar series of separate compartments designated B along the other side. A central aisle C extends lengthwise of the car between the two groups of compartments. A main air duct D extends substantially the full length of the car and is provided at spaced locations with branch ducts E—E' which lead from the main duct into the several compartments of the groups A and B, respectively. At one end of the main duct D, an electrically operated blower 11 is provided which serves to draw air from the outside of the car, for example the vestibule 12, and force it into the main air duct D. The air is passed through suitable filters 13 so as to remove all foreign matter from the air before it is delivered into the main duct D. Positioned in the main air duct is a primary apparatus for supplying tempered air including an air heating element 14 and a cooling element 15, each of which may be selectively energized by the control system hereinafter described to heat or cool the air to a desired temperature before it is introduced into the main duct D. The air in the main duct is maintained at a uniform temperature but somewhat lower than the temperature which would be normally required to provide the desired comfort in the several compartments of the car. For example, during the heating cycle of the system the air in the main duct is maintained at temperatures of 60° to 65° Fahrenheit. The temperature of the air is raised by means of booster heaters 16 located in the branch ducts E—E' which lead from the main duct D into each of the several compartments A or B, as the case may be. The effectiveness of the booster heaters 16 are individually controlled by means of control mechanism responsive to the temperature of the individual compartments associated with the booster heaters.

During the heating cycle, particularly when the outside temperature stands below 40° Fahrenheit, heat is delivered to floor radiators 17—17' which are preferably located at opposite sides of the car and extend substantially from end to end of the car. The said radiators 17—17' are enclosed in suitable grills 18—18' near the floor level of the car so that a portion of the heat from the radiators will pass directly into each of the several compartments. The grills also communicate with passages designated 19—19' formed in the side wall structure of the car and having outlet openings 20—20' through the window sills 21 of the car. A portion of the heated air passing over the floor radiators 17—17' will move upwardly through the passages 19—19' and be discharged from openings 20—20' across the glass pane of the car windows. The wall structure between adjacent windows provides passages 22—22' which directs a portion of the air from the floor radiators to outlet openings 23—23' located adjacent the top of the car windows (see Figs. 2 and 3).

The floor radiators are preferably of the inner feed type comprising an outer pipe 24 connected at one end to the outlet chamber 25 of an admission valve structure 26. The pipe 24 extends substantially the full length of the car and is provided on its outer surface with heat dissipating fins 27. Heating medium is delivered into the radiator from the inlet pipe 28 through a normally open but energized closed solenoid control valve 29 into the valve inlet chamber 30. The said heating medium then passes through a feed pipe 31 which is located within and concentric to the outer pipe 24 of the radiators. The heating medium is discharged from the inner pipe at its outer end and flows rearwardly toward the valve structure through the outer pipe 24 and is discharged through the drain pipe 32.

The main heating element 14 and the cooling element 15 for supplying tempered air to the main duct D are controlled by thermostats located in the duct D. The thermostat for controlling the heating element 14 is designated 33 and is preferably set to function at 60° F. The cooling control thermostat is designated 34 and is likewise positioned in the main duct D. It is preferably set to function at 76° F. The particular setting is merely a matter of convenience and is not critical. The functioning of the floor radiators are controlled by means including a thermostat 47 which preferably responds to the temperature of the side wall panel. Only one of these thermostats is shown for controlling the floor radiators at opposite sides of the car.

The booster heaters 16 are of the conventional honeycomb type and are supplied with heating medium, for example steam, through an electrically controlled admission valve 36, the steam being taken from the train line 37 through branch supply line 38 to supply each of the several booster heaters 16. The valve is normally closed by a spring 39 and is opened by the energization of a solenoid 40. The condensate is discharged through a drain 41 leading from each of the several booster heaters to a conventional steam trap 42.

The solenoid 40 of each of the several booster heater valves is controlled by means including a thermostat located within each of the several compartments. The thermostats located in compartments A, for purpose of convenience, are designated 41 and the thermostats located in the compartments B are designated 41'. These thermostats are responsive to the temperature of the compartment in which they are located. Each of the said thermostats 41—41' is provided with an electrical heater 42—42' which is connected to a source of electrical energy through a potentiometer 43—43', whereby the temperature settings of the thermostats 41—41' may be individually adjusted to any suitable temperature between 65 and 80°. For example, when the potentiometer arm 44—44' is positioned to include the total resistance of the potentiometer, the associated thermostat 41 or 41', as the case may be, will have a functional setting of 80° F. and when the potentiometer arm is moved so as to eliminate all resistance the thermostat will have a temperature setting of 65° F.

The solenoid valve 29 for controlling the heating medium to a floor radiator is normally held in its open position by means of a spring 45 and is closed by the energization of the solenoid 46—46'. Inasmuch as both floor radiators are controlled by one thermostat 47 the valve solenoids 46—46' are connected in parallel. The thermostat 47 is provided with an electrical heater 48 which is connected through a potentiometer K adapted to be controlled by the porter or other authorized persons of the train crew to vary the temperature setting of the radiator control thermostat 47. The energizing circuit for the said electrical heaters 48 are also connected, through metering resistors 49—49' (Fig. 6), with each of the potentiometers 43—43'. The metering resistors 49—49', as herein illustrated, have a resistance value of 1° Fahrenheit when the potentiometer arm is moved to a position to exclude all resistance. However, the effect of said metered resistors are proportionately reduced when the potential is decreased by shifting the potentiometer arms 44—44' in a direction to introduce greater resistance.

Figure 6:
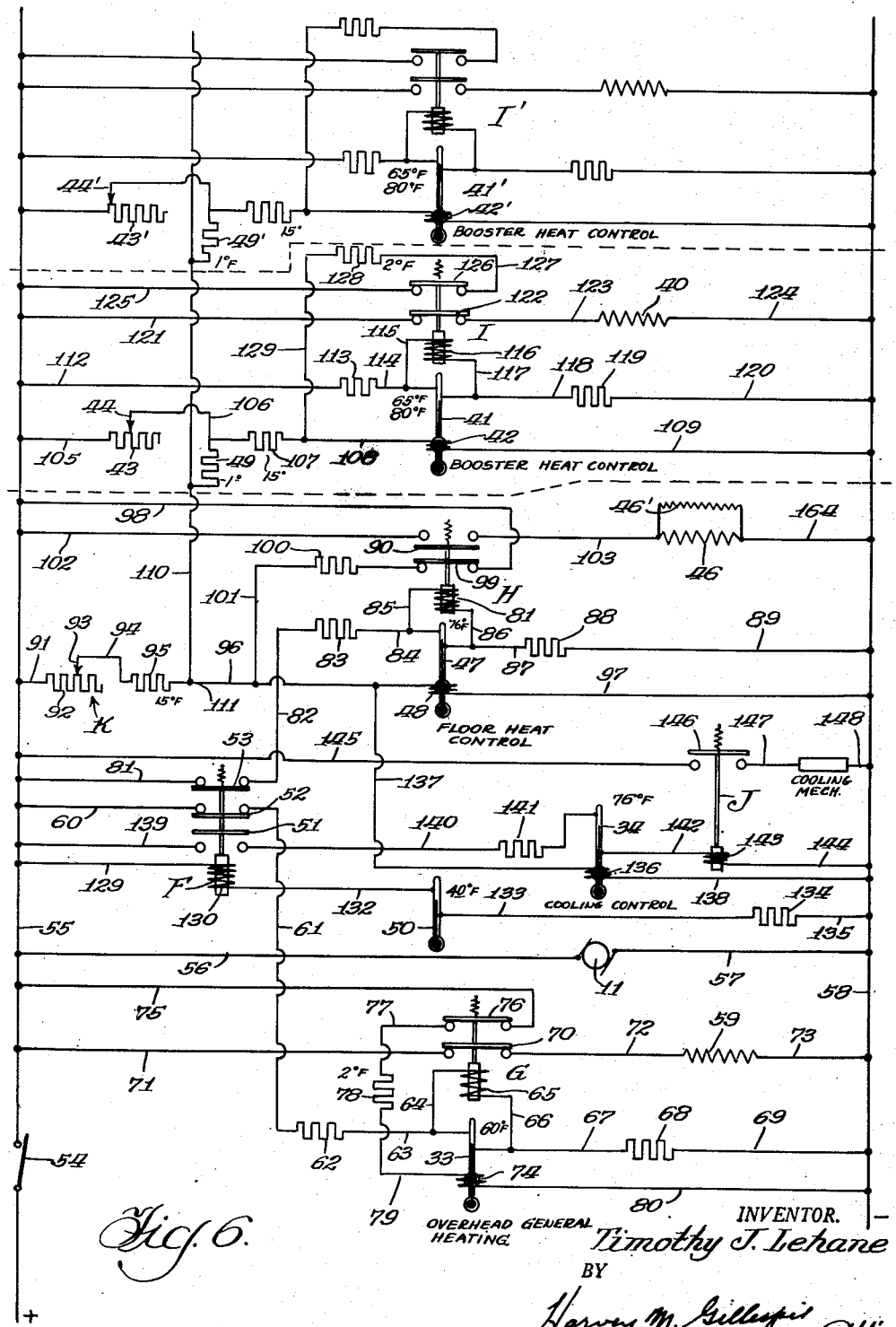
Fig. 6 illustrates a wiring diagram for cooperatively connecting the several control elements of the control system.

Referring now to the circuit diagram of Fig. 6: In addition to the control thermostats previously mentioned the circuit includes an outside thermostat 50 which is normally set to function at 40° F. This thermostat controls the energization of a relay F provided with three bridge arms 51, 52 and 53. The bridge arm 52 is included in a circuit leading to the upper contact of duct thermostat 33 which, as before indicated, is normally set to function at 60° F. The bridge arm 53 leads to the upper contact of thermostat 47 for controlling the energization of the floor radiator admission valve solenoids 46—46'. The several control elements are shown in the positions which they will assume when the outside temperature is below 40° F. and the temperature in duct D is below 60° F. and the temperatures in the individual enclosures $a$ are below the temperature settings of thermostats 41 and the individual temperatures within the compartments B are at or above the temperature settings of thermostats 41'. Under the assumed conditions, the main switch 54 is closed and thereby closes a circuit through the blower 11. The blower normally operates continuously during the operation of the system and is energized by a circuit leading from the positive line 55 through conductor 56, blower 11 and conductor 57 to the negative line 58. Inasmuch as the outside temperature is below 40° F. the mercury column of thermostat 50 stands below the upper contact of this thermostat. Consequently the relay F is de-energized. When the relay F is in its de-energized position and the duct thermostat 33 is calling for heat the relay G, associated with duct thermostat 33, is energized to close an electric circuit through solenoid valve 59 to admit heating medium to the main heater 14. The energizing circuit for relay G leads from the positive line 55 through wire 60, bridge arm 52 of relay F, wire 61, resistor 62, and wires 63 and 64 through the solenoid coil 65 of relay G and thence through wires 66, 67, resistor 68 and wire 69 to the negative line 58. The energization of relay G closes its contacts 70 so as to close an energizing circuit through the solenoid admission valve 59 for controlling the supply of heating medium to the main heater 14. This circuit leads from the positive line through wire 71, closed relay contact 70, wire 72, solenoid valve coil 59 and wire 73 to the negative line 58. Simultaneously with the opening of the admission valve 59 to deliver heating medium to the main heater 14 a circuit is closed through an auxiliary heater 74 for adding 2° of heat to the thermostat 33. This heating circuit leads from the positive line 55 through wire 75, closed contact 76 of relay G, wire 77 and metered resistor 78 and wire 79 to the electrical heater 74 and thence through wire 80 to the negative line 58. When the temperature of the air within the main duct rises to 58° the 2° of heat added to the resistor 78 will be sufficient to close the upper contact of the thermostat 33. In such case the electrical current by-passes the solenoid 65 of relay G and passes directly from wire 63 through wire 67 through the mercury column thermostat 33 and thereby results in de-energizing relay G whereupon the contacts 70 and 76 move to their open position. This condition is maintained only momentarily since the opening of the contact 76 de-energizes the electrical heater 74, whereupon mercury column of thermostat 33 will recede to a position below its upper contact so as to effect re-energization of the relay G. This cycling operation will continue until the temperature of the air within the main duct D rises to the functional setting of thermostat 33.

The de-energized position of relay F, in addition to closing its contact 52, also closes its contact 53. The closing of this contact, when the floor heat thermostat 47 is calling for heat, closes an energizing circuit through the solenoid 81 of relay H which controls the energization of the solenoids 46—46' associated with the floor radiator admission valves 29. This relay energizing circuit leads from positive line 55 through wire 81, de-energized closed contact 53 of relay F, wire 82, resistor 83 and wires 84 and 85 through solenoid coil 81 of relay H and thence through wires 86, 87, resistor 88 and wire 89 to the negative line 58. In the energized position of relay H, its bridge arm 90 is opened and therefore the actuating solenoids 46—46' of the floor heat valves 29 are de-energized to permit the valves to open. The functional setting of thermostat 47, may be varied by varying the intensity of the energizing current supplied to its heater 48. The intensity of this heating current is controlled by means of a variable resistor 92 under the control of the porter. The normal heating current to heater 48 therefore leads from positive line 55 through wire 91, variable resistor 92 of potentiometer K, potentiometer arm 93, wire 94, metered resistor 95, having a resistance value of 15° F., wire 96 to heater 48 and thence through wire 97 to negative line 58. With the illustrated adjustment of variable resistor K sufficient heat is applied to thermostat 47 to establish a functional setting of 70° F. When the relay H is energized, as herein indicated, additional heat (approximately 2°) is added to the heater 48 to produce cycling operations. This heating circuit leads from positive line 55 through wire 98, closed contact 99 of relay H, metered resistor 100 and wire 101 to wire 96 and thence through the heater coil 48 and wire 97 to the negative line 58. This last mentioned heating circuit is effective only momentarily when the temperature of the side wall panels stands within 2° of the functional setting of thermostat 47. When the temperature of the wall panels is sufficient to hold the mercury column of thermostat 47 in engagement with its upper contact the electrical current in wire 84 is directed through the mercury column to wire 87 and thereby by-pass the relay coil 81 so as to release the relay. As soon as the temperature of the wall is sufficient to maintain the thermostat 47 closed without the additional 2° of heat supplied through resistor 100 the relay H is released so as to move its contact 90 to its closed position and thereby establish an energizing circuit through the valve solenoids 46—46' to shut off the supply of heating medium to the floor radiators. The energizing circuit for said solenoids 46—46' leads from positive line 55 through wire 102, closed contact 90 of relay H, wire 103 through the solenoids 46—46' and wire 104 to the negative line 58.

The thermostats 41 and 41' for controlling the effectiveness of the booster heaters 16 are located within the individual enclosures so as to be responsive to the temperature therein. Inasmuch as the thermostats and their associated relays I—I' are of like construction, only two of said thermostats and relays are illustrated in the wiring diagram. In this connection the thermostat 41 will be described and corresponding numbers with the prime exponent will identify corresponding parts for thermostat 41'.

The thermostat 41, as previously indicated, is provided with an electrical heater 42 which is energized by a circuit leading from positive line 55 through wire 105, variable resistor 43, wire 106 and metered resistance 107, having a maximum value of 15°, wire 108, electrical heater 42 and wire 109 to the negative line 58. The variable resistor 43 makes it possible to adjust the temperature setting of thermostat 41 from 65° to 80°. For example, when all of the resistance 43 is included in the circuit the thermostat 41 will function at 80°. When all of the resistance 43 is removed from the circuit the thermostat will function at 65°, the amount of electric current supplied to the heater 42 being then determined by the value of the resistor 107. A resistor 49, having a maximum value of 1° of heat, is connected in the heating circuit controlled by the potentiometer 43 and leads to the electrical heater 48 of the floor radiator thermostat 47. Consequently when all of the resistance of potentiometer 43 is excluded from the heating circuit for thermostat 41 so that the latter will function at 65° F., 1° of additional heat is added to the floor radiator control thermostat 47 so as to adjust this thermostat in relation to the lower temperature setting of the individual room thermostat 41. The heating circuit of each room thermostat 41—41' supplies additional heating current through resistors 49—49' to the heater 48 of the said floor radiator thermostat, each of the said resistors 49—49' being connected into a conductor 110 which is joined at 111 with the wire 96 leading to the heater 48 of thermostat 47. It will be seen therefore that the thermostat 47 is adjusted in relation to the temperature settings of all room thermostats. In the present illustration it will be seen that the movable arm 44' of the potentiometer associated with thermostat 41' is adjusted so as to remove all of the resistance 43'. In such case the thermostat 41' receives the full 15° set-down and therefore will function at 65° F. and one full degree of heat is added by resistor 49' to the heater 48 of the floor radiator thermostat 47 whereas the arm 44 of the potentiometer associated with thermostat 41 is adjusted to add sufficient resistance in the heater circuit, whereby said thermostat 41 will function at approximately 70°. Consequently the electrical current supplied to heater 48 through resistor 49 is less than 1°. The relay I is under the control of thermostat 41. When the thermostat calls for heat the relay is energized by a circuit leading from positive line 55 through wire 112, resistor 113 and wires 114 and 115 through solenoid coil 116 and thence through wires 117 and 118, resistor 119 and wire 120 to the negative line 58. The energization of relay I closes an energizing circuit through the solenoid 40 to open the admission valve 36 and thereby deliver heating medium to the booster heater 16. This energizing circuit leads from positive line through wire 121, relay closed contact 122 of relay I, wire 123, valve solenoid 40 and wire 124 to the negative line 58. Simultaneously with the closing of the last mentioned energizing circuit additional heating current is applied to the thermostat heater 42 through a circuit leading from the positive line through wire 125, closed contact 126 of relay I, wire 127, metered resistor 128, wire 129 and wire 108 to the heater 42 and thence through wire 109 to the negative line 58. The resistor 128 has a value of approximately 2° F. Consequently, when the temperature at thermostat 41 is within 2° of its functional setting the 2° of heat added to the resistor 128 will close the thermostat at its upper contact so as to de-energize the relay I, the electric current, in such case, being passed directly from wire 114 to wire 118 through the mercury column of thermostat 41. The removal of the 2° of heat, by virtue of the de-energization of relay I, will again result in re-energizing relay I to momentarily energize solenoid 40 to open admission valve 36 and thereby admit a burst of heating medium into the booster heater 16. This cycling action will continue until the temperature of the enclosure A in which thermostat 41 is located reaches the temperature setting of the thermostat. For example, 70° for the thermostat 41 or 65° for the thermostat 41'.

Referring now to the control function of the system during the cooling of the enclosures A and B: When the outside temperature rises to 40° F. or higher the outside thermostat 50 is closed and thereby completes an energizing circuit through the actuating solenoid 130. This energizing circuit leads from positive line 55 through wire 129, relay coil 130, wire 132, mercury column of thermostat 50 to wire 133 and thence through resistor 134 and wire 135 to the negative line 58. The energization of relay F opens the contacts 52 and 53 so as to deenergize relays G and H and thereby shut off all heat to the air heater 14 and to the floor radiator 17—17'. However, heating medium remains available to the booster heaters 16 and these heaters remain operative under the control of their respective control thermostats 41—41'.

The cooling apparatus 15 is energized by the closing of relay J which relay is under the control of thermostat 34. This thermostat is normally set to function at 76° F. when no heat is applied to its electrical heater 136. This heater is preferably connected in parallel with the heater 48 of the floor radiator thermostat 47 and consequently is proportionately adjusted by the variable resistance 92 of potentiometer K. The heating circuit for said heater 136 leads from wire 96 through wire 137 through heater 136 and thence through wire 138 to the negative line 58. It will be observed, therefore, that the cooling control thermostat 34 is also automatically adjusted in relation to the temperature settings of the several room thermostats since the current passing through the several resistors 49—49' also applied heat to the heater 136 of the cooling control thermostat 34. When the temperature in duct D reaches the functional setting of the cooler control thermostat 34 the said relay J is energized by a circuit leading from positive line 55 through wire 139, energized closed contact 51 of relay F, wire 140, resistor 141 to the upper contact of thermostat 34 and thence through the mercury column of the thermostat to wire 142, solenoid 143 of relay J and wire 144 to the negative line 58. The energization of relay J closes an energizing circuit through the cooling mechanism, including the compressors, valves, etc., for supplying a coolant to the cooler 15. The cooling mechanism is of conventional construction and therefore is not shown in the present application. The energizing circuit for the cooling mechanism leads from the positive line 55 through wire 145, a closed contact 146 of relay J, wire 147, cooling mechanism and wire 148 to the negative line 58.

I claim:

1. In combination with apparatus for influencing the temperatures within a plurality of enclosed spaces collectively, means including a thermostat responsive to a predetermined temperature for controlling the effectiveness of said apparatus, means for adjusting the functional setting of said thermostat, individual temperature altering apparatus associated with each of said enclosed spaces, means including a plurality of individual thermostats responsive to the temperatures of the separate enclosures for controlling the operation of said individual temperature altering apparatus, manually operable means for separately varying the functional settings of said individual thermostats, and means separately associated with each of the several manually operable means and operable both individually and collectively to adjust within a prescribed limit and in proportion to the adjustments of the individual thermostats, the temperature setting of the thermostat for controlling the first mentioned temperature altering apparatus.

2. In combination with a primary air heater for supplying tempered air to a plurality of enclosed spaces, means including a thermostat responsive to the temperature of the said tempered air and set to function at a predetermined temperature for controlling the effectiveness of said primary air heater, a heat radiator for radiating heat directly into the several enclosed spaces as a group, means including a thermostat responsive to a temperature factor common to all said spaces of said group and set to function at a predetermined temperature to control the effectiveness of the said heat radiator, a booster heater associated with each enclosed space for adding heat to the tempered air immediately prior to its delivery into its associated enclosed space, means including separate thermostats associated with each of the several enclosed spaces and responsive to the temperature of its associated space for controlling the effectiveness of its associated booster heater, electrical heaters for the several thermostats for controlling said booster heaters, energizing circuits therefor connected through individual variable resistors for varying the volume of heat applied to the thermostats, an electrical heater for the thermostat which controls said heat radiator, an energizing circuit therefor, and impedance connections leading from each of the variable heater circuits associated with the booster heater control thermostats and connected into the energizing circuit for the electrical heater for the heat radiator control thermostat so as to automatically adjust the temperature setting of the heat radiator control thermostat in relation to the average temperature settings of the booster heater control thermostats.

3. A temperature control system as defined in claim 2, characterized in that each of the said individual variable resistors is a manually operable potentiometer located in each of the several enclosed spaces for operation by the occupant of such space.

4. A temperature control system as defined in claim 2 in which each of said spaces includes a side wall having inner and outer panels and the said heat radiator is postioned between said panels and the heat radiator control thermostat responds to the temperature of the inner panel of the side wall.

5. A temperature control system as defined in claim 2 in which each impedance connection includes a metered resistor having a predetermined maximum value when the variable resistance associated therewith is least effective.

6. A temperature control system as defined in claim 5 in which the several metered resistors are tapped into parallel heater circuits and into a bus connector connected in the circuit for energizing the heater of the heat radiator control thermostat.

7. In combination with apparatus, including an air cooling element, for supplying tempered air to a plurality of enclosed spaces, means including a thermostat responsive to the temperature of the said tempered air and set to function at a predetermined temperature for controlling the effectiveness of said air cooling element, individual apparatus associated with the individual spaces for altering the temperature of the air supply immediately before its delivery into an individual space, means including separate thermostats associated with each of the several enclosed spaces and responsive to the temperature of its associated space for controlling the effectiveness of its associated individual temperature altering apparatus, electrical heaters for the several thermostats for controlling said individual temperature altering apparatus, energizing circuits therefor connected through individual variable resistors for varying the volume of heat applied to the thermostats, an electrical heater for the thermostat which controls the said air cooling element, an energizing circuit therefor, and impedance connections leading from each of the variable heater circuits associated with the individual temperature altering apparatus control thermostats and connected into the energizing circuit for the electrical heater of the cooling element control thermostat so as to proportionately adjust the temperature setting of the cooling element control thermostat in relation to the average temperature settings of the several thermostats associated with each of the several en altering apparatus.

8. A temperature control system as defined in claim 7, characterized in that the individual temperature altering apparatuses are air heaters for raising the temperature of the previously cooled air and the manually operable means for varying the temperature settings of the separate space thermostats is a potentiometer located in each of the several enclosed spaces for operation by the occupant of such space.

9. A temperature control system as defined in claim 8 in which each impedance connection includes a metered resistor having a predetermined maximum value when the variable resistance associated therewith is least effective.

10. A temperature control system as defined in claim 9 in which the several metered resistors are tapped into parallel heater circuits and into a bus connector connected in the circuit for energizing the heater of said air cooling element control thermostat.

TIMOTHY J. LEHANE.

References Cited in the file of this patent
UNITED STATES PATENTS

| Number | Name | Date |
|---|---|---|
| 2,234,288 | Smith et al. | Mar. 11, 1941 |
| 2,476,199 | Lehane et al. | July 12, 1949 |
| 2,613,919 | Russell et al. | Oct. 14, 1952 |